(12) United States Patent
Han et al.

(10) Patent No.: US 8,216,542 B2
(45) Date of Patent: Jul. 10, 2012

(54) METHOD FOR SEPARATING NANOTUBES USING MICROWAVE RADIATION

(75) Inventors: Chang-Soo Han, Dajeon (KR); Jin-Won Song, Dajeon (KR); June-Ki Park, Dajeon (KR); Jong-Hong Lee, Cheongju-si (KR); Hee-Won Seo, Dajeon (KR); Ji-Eun Kim, Dajeon (KR); Dae-Geun Choi, Dajeon (KR)

(73) Assignee: Korea Institute of Machinery And Materials, Dajon (KR)

( * ) Notice: Subject to any disclaimer, the term of this patent is extended or adjusted under 35 U.S.C. 154(b) by 272 days.

(21) Appl. No.: 11/359,349

(22) Filed: Feb. 22, 2006

(65) Prior Publication Data
US 2011/0024333 A1   Feb. 3, 2011

(51) Int. Cl.
*D01F 9/12* (2006.01)
(52) U.S. Cl. .......... 423/461; 423/447.1; 209/7
(58) Field of Classification Search ........ 423/461, 423/447.1, 447.2, 447.3, 445 B; 977/742–754, 977/842–848; 204/157.47; 209/7
See application file for complete search history.

(56) References Cited

U.S. PATENT DOCUMENTS

| | | | |
|---|---|---|---|
| 6,819,053 B2 * | 11/2004 | Johnson | 315/111.51 |
| 2004/0191157 A1 * | 9/2004 | Harutyunyan et al. | 423/447.1 |
| 2005/0186378 A1 * | 8/2005 | Bhatt | 428/36.9 |
| 2007/0125707 A1 * | 6/2007 | Komatsu et al. | 210/634 |

OTHER PUBLICATIONS

Ko, et al., Highly efficient microwave-assisted purification of multiwalled carbon nanotubes, Microelectronic Engineering 2004; 73-74: 570-577.*
Kataura, et al., Optical Properties of Single-Wall Carbon Nanotubes, Synthetic Metals 1999; 103: 2555-2558.*
Shim, et al., Preferential elimination of metallic single-walled carbon nanotubes using microwave irradiation, Nanotechnology 2009; 20, 065707: 1-5.*

* cited by examiner

*Primary Examiner* — Daniel C. McCracken
(74) *Attorney, Agent, or Firm* — Lathrop & Gage LLP

(57) ABSTRACT

A method for separating carbon nanotubes is disclosed where nanotubes with specific properties are separated from a mixture of nanotube products, which contains various types of nanotubes and impurities.

10 Claims, 4 Drawing Sheets

METHOD FOR SEPARATING NANOTUBES USING MICROWAVE RADIATION

RELATED APPLICATIONS

This application is a continuation-in-part of Republic of Korea application serial number 10-2005-0073420 filed Aug. 10, 2005, which is incorporated by reference herein.

FIELD OF THE INVENTION

The present invention relates to a method for separating nanotubes, specifically carbon nanotubes. More specifically, the present invention provides a method for selectively separating nanotubes having semiconducting properties from a mixture of nanotubes having various other properties and impurities.

BACKGROUND

A nanotube is a material which has a long and thin cylindrical shape with a diameter of nanometer scale. According to the wall structure, nanotubes can be categorized into single-walled nanotubes (SWNT), in which the wall consists of one single layer, and multi-walled nanotubes (MWNT), in which the wall consists of multiple layers. Typically, the diameter of SWNT is not more than 1 nm and the diameter of MWNT is in the range of 10-100 nm; however, their diameters may be varied depending on the production method and conditions used. Although nanotubes are generally known to be a few micrometers in length, studies which disclose the development of nanotubes having a length of up to several millimeters have been recently reported.

As one of the representative examples of nanotubes, carbon nanotubes (CNT) can be mentioned by way of specific example. CNT are carbon allotropes containing carbon, which is one of the materials present in the earth in large quantities. CNT have a long and thin generally tubular shape in which carbon atoms are bound to each other in a network forming a hexagonal pattern that somewhat resembles a honeycomb. CNT have a number of advantageous properties, such as being almost one hundred times as strong as steel with a weight as light as aluminum; having a superior ability to deliver electricity as compared to copper; having a strong resistance to chemical and physical environments; being able to bind large quantities of various other chemical substances due to their tube-type shape which provides a relatively large surface area; possessing semiconducting or metallic properties; and other recognized advantages. Owing to such various advantages, CNT have been widely studied and utilized in a wide variety of fields including as electron emitters in various devices, vacuum fluorescent displays (VFD), white light sources, field emission displays (FED), electrodes for lithium secondary batteries, hydrogen-storage fuel cells, nano-wires, nano-capsules, nano-pincettes, AFM/STM tips, single electron transistors, gas sensors, fine parts for medical or engineering use, highly functional composites and the like.

When produced by conventional methods, a mixture of nanotubes of different properties is obtained; particularly, a mixture of semiconducting and metallic nanotubes is formed. In an attempt to separate nanotubes by their properties from the mixture of nanotubes having different properties, many studies have been conducted. However, no study has provided a practical method for the selective separation of semiconducting, or non-metallic nanotubes, and metallic nanotubes on an industrial scale.

Although R. Krupke suggested a method for separating metallic nanotubes from a mixture of nanotubes having various properties using, for example, dielectrophoresis, there have not been any methods suggested, so far, which successfully separate non-metallic, or semiconducting, nanotubes from the mixture of nanotubes.

In order to collect and use the separated nanotubes in the manufacturing of various devices, the nanotube mixture is treated, separated and collected in a powdered form.

SUMMARY

The present invention has been developed to solve the above-mentioned problems, and thus the object of the present invention is to provide a method for selectively separating semiconducting nanotubes from a nanotube mixture where nanotubes and impurities are present or nanotubes having different properties are present. A nanotube mixture in the form of a dispersion or bulk powder may be treated, separated and collected by the methods disclosed herein.

DETAILED DESCRIPTION

Figure 1:
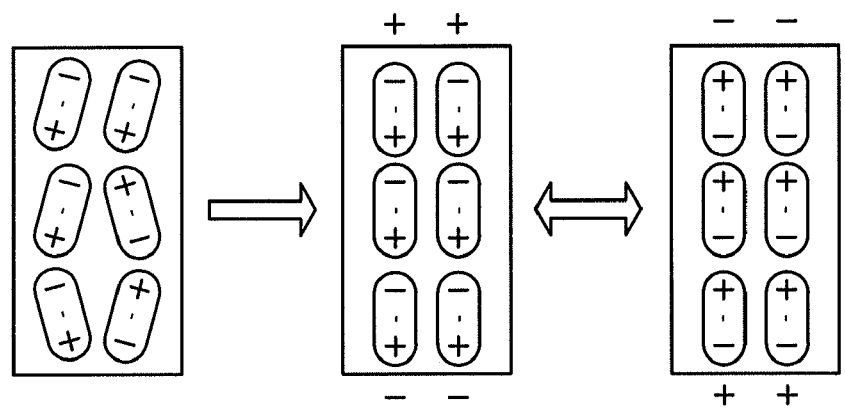
FIG. 1 is a view illustrating the principle of nanotube polarization when microwave radiation is applied in the method for separating nanotubes.

According to the present invention, provided is a method for separating nanotubes from a nanotube mixture comprised of semiconducting nanotubes and materials other than semiconducting nanotubes, characterized in that at least part of the mixture, other than the semiconducting nanotubes, is selectively heated and removed by applying microwave radiation to the mixture.

According to the method for separating nanotubes, the nanotubes are selected from the group consisting of single-walled nanotubes, double-walled nanotubes, multi-walled nanotubes, carbon nanofibers and graphite. The nanotubes may have a surface modified with nanoparticles of metals, such as gold, silver, copper or the like.

According to the method for separating nanotubes, the nanotube mixture comprises semiconducting nanotubes and materials other than the semiconducting nanotubes. As for the materials other than the semiconducting nanotubes, impurities or metallic nanotubes may be mentioned. Accordingly, the term "a nanotube mixture" collectively refers to a mixture of semiconducting nanotubes and impurities, a mixture of semiconducting nanotubes and metallic nanotubes, or a mixture of semiconducting nanotubes, metallic nanotubes and impurities.

The microwave radiation used in the method for separating and purifying nanotubes is a type of electromagnetic radiation ranging between infrared radiation and radio waves in the electromagnetic spectrum; it has a frequency between about 300 MHz-30 GHz, a wavelength between about 1 cm-1 m, and is matched and polarized. In order to avoid overlapping with radar transmissions and telecommunication frequencies, microwave radiation for general home use has a frequency of 2.45 GHz and a wavelength of 12.2 cm, while microwave radiation for industrial use has a frequency of 900 MHz and a wavelength of 33.3 cm. In the present invention, either type of microwave radiation may be used.

Upon the application of microwave radiation to a material, the degree of penetration, absorption or reflection of the applied microwave radiation is varied dependent on the species comprising the material and the temperature.

Generally, polar materials, such as water, polar solvents, polar polymers or the like, and conductive or magnetic materials, such as $Co_2O_3$, $MnO_2$, $NiO$, $Fe_2O_3$, $CuO$ or the like, absorb microwave radiation well and thus can be easily heated. As for ceramic materials, such as $Al_2O_3$, $MgO$, $SiO_2$, silicate glasses or the like, they allow microwaves to penetrate at room temperature, but above their critical temperatures they are gradually coupled with the microwave owing to the geometric increase in loss tangent (tan δ) value; thus, they effectively absorb the microwave radiation and are heated. In some cases, a thermal runaway by hot points can also occur. Thermal runaway is a condition where an increase in the ambient temperature causes a decrease, rather than an increase, in the internal resistance in a semiconductor. In contrast to this, insulating materials or non-polar polymers having a low loss tangent value do not absorb microwave radiation, and accordingly cannot be heated. Therefore, it is preferable to apply microwave radiation to the mixture of nanotubes in a reaction vessel made of an insulating material or non-polar polymer. Also, it is preferable to apply microwave radiation after arranging a material including carbon black under the mixture of nanotubes.

As discussed above, heating with microwave radiation has a relation to dielectric loss occurring in a material. The term "dielectric loss" means energy loss as a form of heat in a dielectric when applying an alternating current (AC) electric field to the dielectric. When a dielectric is inserted into an electrode and AC voltage is applied to the dielectric, the phase of the flowing current changes as a function of the dielectric loss angle (δ), rather than propagating at 90°, and the dielectric loss is proportional to tan δ, i.e., the loss tangent value. Dielectric loss as such is directly related to the polarization of a material that occurs when an external electromagnetic field, e.g., a microwave field, is applied, as illustrated in FIG. 1. Heat generation in ceramics or glasses in the microwave range have been known to be the result of energy loss occurring mainly by ion polarization at room temperature and by space charge polarization at high temperature. Further, heat generation occurring in semiconductor materials having free conduction elements, or in minute solid particles of metals or metal oxides, has been known to be the result of energy loss owing to space charge polarization.

When microwave radiation is applied to a material, the average power of the microwave being absorbed into the material with a given volume can be represented by the following formula:

$$P = 2\pi f \epsilon_0 \epsilon_r' \tan \delta\, E^2$$

wherein, $f$ is a frequency, $\epsilon_0$ is a vacuum permittivity, $\epsilon_r'$ is a specific dielectric constant, tan δ is a loss tangent, and E is intensity of the electric field.

As seen from the above formula, the power of the microwave being absorbed into the material is proportional to the frequency of the microwave, the specific dielectric constant and loss tangent of the material and the like. Therefore, the higher the specific dielectric constant and loss tangent value of the material, the more microwave radiation is absorbed, resulting in quicker heat generation.

Nanotubes, such as carbon nanotubes, are typically synthesized in the form of a powder having metallic or semiconducting properties depending on the bonding and the growth pattern of the components. According to such properties, nanotubes vary in their intrinsic characteristics such as specific dielectric constant, loss tangent and the like, wherein metallic nanotubes have a specific dielectric constant and loss tangent value greater than those of semiconducting nanotubes, and naturally the degree of heat generation differs upon application of microwave radiation.

Therefore, by using the dielectric characteristics of a material, as mentioned above, the present invention makes possible the selective heating, vaporizing and finally removing of materials other than semiconducting nanotubes; specifically, metallic nanotubes among nanotubes having different properties in a nanotube mixture. In order to separate the semiconducting nanotubes more effectively, it is preferable to provide a gaseous atmosphere during microwave heating, wherein the gas reacts with metallic nanotubes at high temperature.

Further, according to the separating method described herein, the nanotube mixture is preferably treated in the form of a powder, in order to reduce the material loss during the separation and purification process, increase the recovery of the resulting nanotubes from the separation and purification process, and to provide for convenient use in the formation of final products.

Further, a method can also be used in which the application of microwave radiation is carried out after dispersing a nanotube mixture into a liquid medium and then applying the dispersion widely onto a suitable substrate so as to achieve uniform heating of the nanotube mixture while vaporizing the liquid medium at once. As for the liquid medium, it is preferred to use a medium that is easily heated and vaporized by microwave radiation, such as water, ethanol and the like.

According to the separating methods described above, the materials other than the semiconducting nanotubes, such as metallic nanotubes or impurities, are removed at least partially; preferably 50% or more, more preferably 70% or more, and still more preferably 90% or more of the materials are removed.

In the separating method, it is preferred to include a filtering process after applying microwave radiation to the nanotube mixture, as described above, in order to separate the side products which have not been vaporized by the selective heating of the materials. As for the filtering process, thermal annealing, centrifugation and the like may be mentioned.

With reference to the attached drawings, one embodiment of the present invention is described below.

Figure 2:
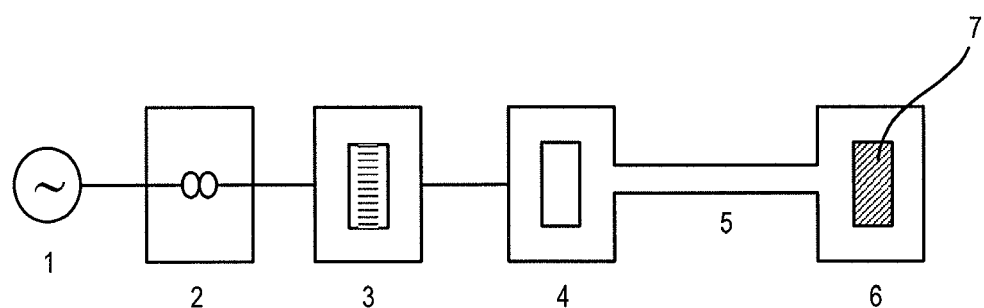
FIG. 2 is a view schematically illustrating one embodiment of the device for separating nanotubes, according to an embodiment.
Figure 3:
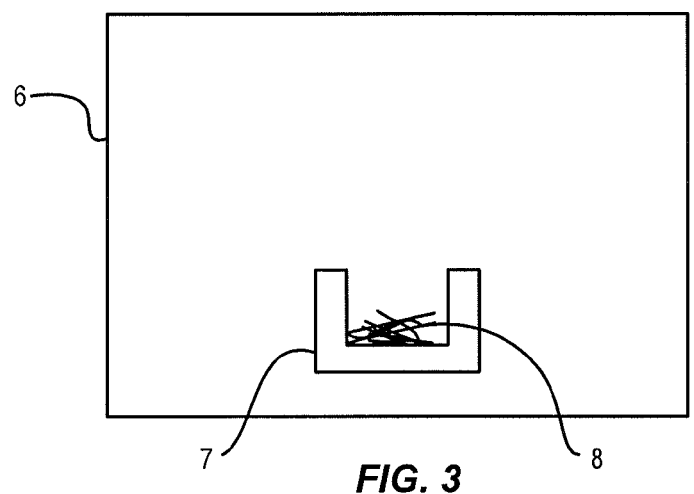
FIG. 3 is a view showing exemplary detail of the reactor part of the device represented in FIG. 2.

FIG. 2 is a view schematically illustrating one embodiment of the device for separating and purifying nanotubes, and FIG. 3 is a view showing exemplary detail of the reactor (6) of the device for separating and purifying nanotubes represented in FIG. 2. The device for separating and purifying nanotubes represented in FIG. 2 comprises a power supply (1), a transformer (2) and a rectifier (3) in addition to a microwave oscillator (4), a waveguide (5), a reactor (6) and a reaction container (7).

Once the electric current is provided by the power supply (1), it passes through the transformer (2) and subsequently the rectifier (3) to the microwave oscillator (4), and then microwave radiation is generated by the microwave oscillator (4). The generated microwave radiation is applied through the waveguide (5) to the nanotube mixture (8) in the form of a powder contained in the reaction container (7) of the reactor (6), wherein the reaction container (7) is comprised of an insulating material having a low loss tangent value or nonpolar polymer.

Depending on the species of components constituting the nanotube mixture and their relative content, and the desired level of purity of semiconducting nanotubes, the microwave application time may be variously adjusted. Upon completion of the microwave application for a predetermined time, side products from the heating process are present in mixed form in the reaction container (7). The side products from the heating process may be subsequently removed through a filtering process such as thermal annealing, and then finally semiconducting nanotubes with high purity may be recovered.

Hereinafter, the present invention is further described in detail through the example given below. However, the scope of the present invention is by no means limited by the example.

EXAMPLES

As illustrated in FIG. 3, a device for separating nanotubes comprised of a microwave oscillator, a waveguide, a reactor and a reaction container was manufactured. To the microwave oscillator of the manufactured device, a rectifier and a transformer were subsequently connected.

A nanotube mixture comprising metallic carbon nanotubes and semiconducting carbon nanotubes was prepared by an arc-discharge process, and Raman spectroscopy was performed on the resulting nanotube mixture. The result was plotted with a solid line in FIG. 4. Based on the Raman spectrum of the carbon nanotube mixture, the estimated content of the metallic carbon nanotubes and semiconducting carbon nanotubes was 43 wt % and 57 wt %, respectively.

The mixture of the metallic carbon nanotubes and the semiconducting carbon nanotubes was placed into a reaction container (7), and microwave radiation was applied to the carbon nanotube mixture for 10 minutes by supplying power to the transformer (2).

Upon completion of the microwave application, the resulting mixture was removed from the container (7) and subjected to a filtering process by thermal annealing, thereby obtaining the purified and separated final product.

Figure 4:
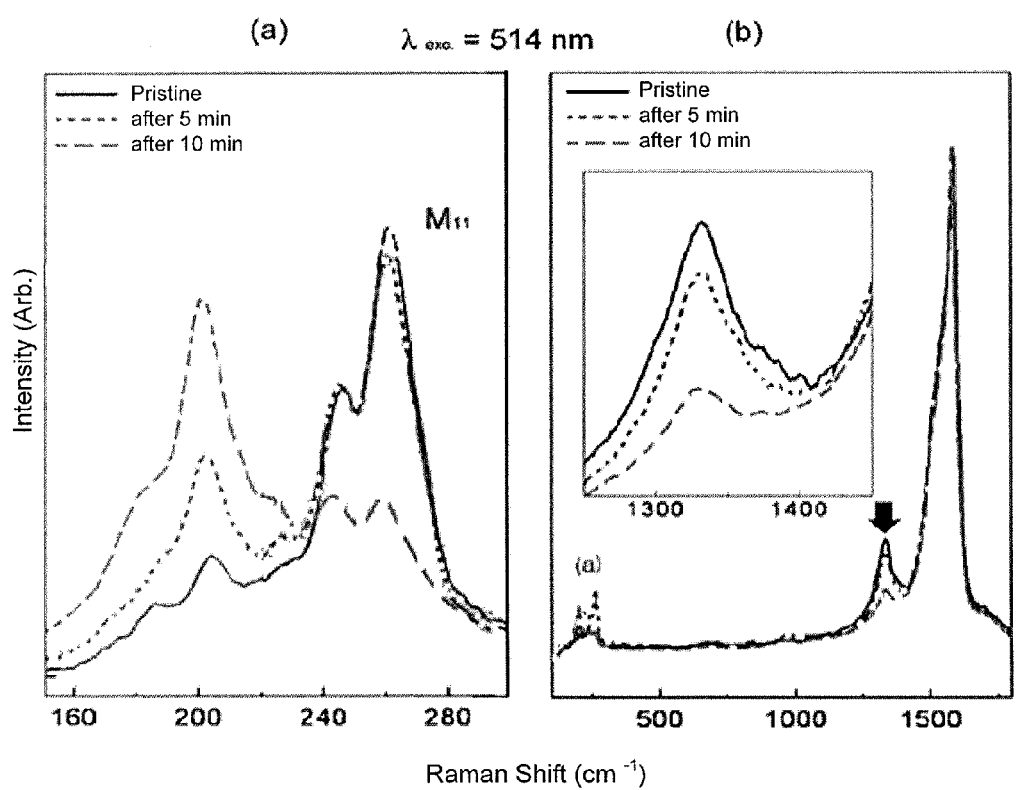
FIG. 4 is a graph showing Raman spectra of samples before and after being treated by a method for separating nanotubes, according to an embodiment.

Raman spectroscopy was performed on the final product at a laser wavelength of 514 nm, and the result was plotted as a dotted line in FIG. 4. The estimated content of the metallic carbon nanotubes and semiconducting carbon nanotubes in the final product was 20 wt % and 80 wt %, respectively.

Another additional advantage of the present method is the production of nanotubes with improved crystallinity due to the destruction of defective nanotubes in the process. This can be seen from FIG. 4 which illustrates the decrease of the D$^-$peak (at about 1300 cm$^{-1}$) after the introduction of microwave radiation.

Figure 5:
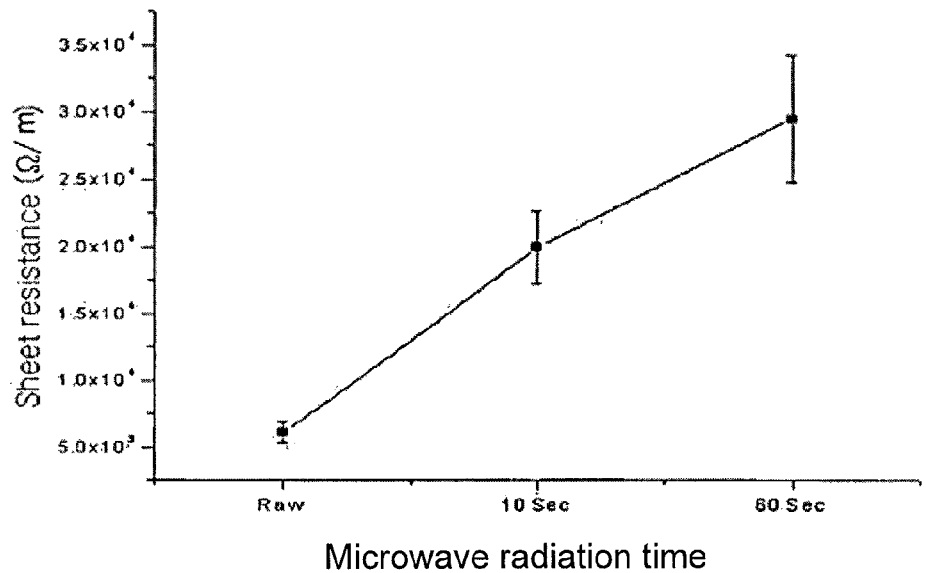
FIG. 5 shows changes in the resistance of a sheet of a mixture of nanotubes before and after treatment by a method for separating nanotubes, according to an embodiment.
Figure 6:
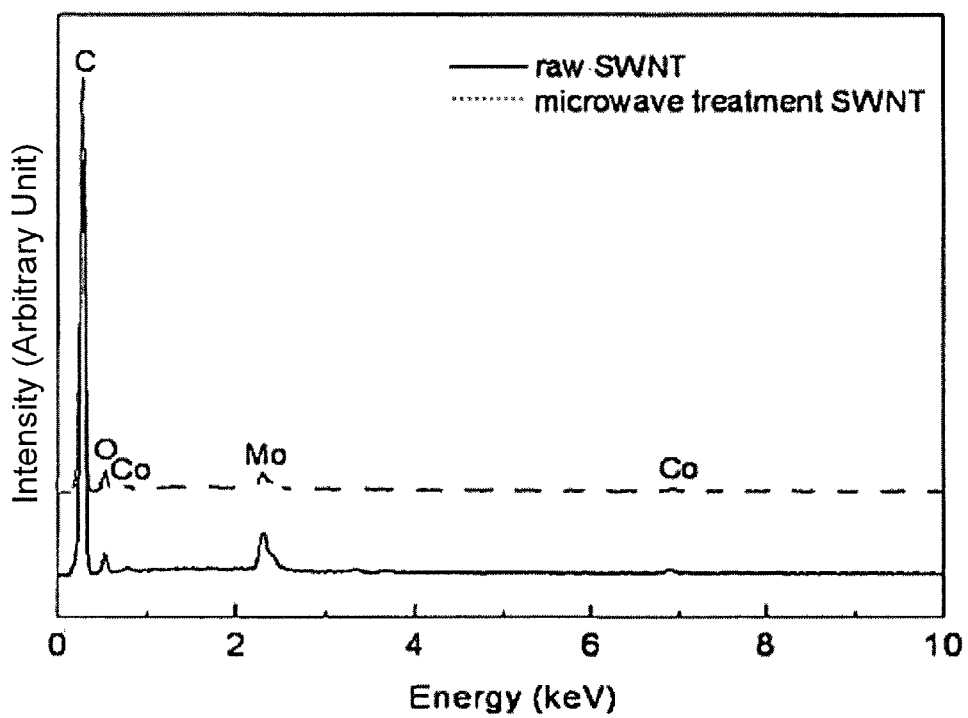
FIG. 6 is a graph showing EDX (Energy Dispersive X-ray) spectra of samples before and after being treated by a method for separating nanotubes, according to an embodiment.

Resistance of the sheet of the nanotubes before and after microwave radiation was measured using a 4-point probe; the result is shown in FIG. 5. It can be seen that resistance increases in the microwave irradiated sample due to the relative decrease of metallic carbon nanotubes. The fact that the remaining metallic nano-particles (Co, Mo) decrease with metallic carbon nanotubes can be seen in the result of EDX spectroscopy shown in FIG. 6.

INDUSTRIAL APPLICABILITY

As described, it is possible to separate large quantities of semiconducting nanotubes from a nanotube mixture comprising metallic nanotubes and impurities in an effective and convenient way. Since the disclosed methods do not damage the semiconducting nanotubes during the separation process, the resulting nanotubes are suitable for direct use. The semiconducting nanotubes with high purity, which have been separated and purified according to the present invention, can be advantageously used in manufacturing various high performance devices in many fields, for example, a probe of a scanning probe microscope (SPM), field emission displays (FED), fuel cells, CNT field effect transistors (CNT-FET), data storage devices, chemical sensors, biosensors and the like.

What is claimed is:

1. A method for separating semiconducting nanotubes from a nanotube mixture comprised of semiconducting nanotubes and metallic nanotubes, comprising:
    dispersing the nanotube mixture into a liquid medium selected from water and ethanol and then applying the dispersion to a substrate made of a material selected from an insulating material or a nonpolar polymer;
    selectively heating at least part of the metallic nanotubes in the nanotube mixture by applying microwave radiation to the nanotube mixture after a material comprising carbon black is arranged under the nanotube mixture; and
    removing the metallic nanotubes.

2. The method for separating semiconducting nanotubes according to claim 1, wherein the nanotubes are selected from the group consisting of single-walled nanotubes, double-walled nanotubes, multi-walled nanotubes, or mixtures thereof.

3. The method for separating semiconducting nanotubes according to claim 1, wherein the nanotubes have a surface modified with metal nanoparticles.

4. The method for separating semiconducting nanotubes according to claim 1, wherein the nanotube mixture is a mixture of semiconducting nanotubes and impurities, a mixture of semiconducting nanotubes and metallic nanotubes, or a mixture of semiconducting nanotubes, metallic nanotubes and impurities.

5. The method for separating semiconducting nanotubes according to claim 1, wherein the microwave radiation has a frequency range between 300 MHz-30 GHz and a wavelength range between 1 cm-1 m.

6. The method for separating semiconducting nanotubes according to claim 5, wherein the microwave has a frequency of 2.45 GHz and a wavelength of 12.2 cm.

7. The method for separating semiconducting nanotubes according to claim 5, wherein the microwave has a frequency of 900 MHz and a wavelength of 33.3 cm.

8. The method for separating semiconducting nanotubes according to claim 1, wherein the nanotube mixture is treated in the form of a powder.

9. The method for separating semiconducting nanotubes according to claim 1, further comprising a filtering process to separate side products which are not vaporized by the selective heating of the materials other than the semiconducting nanotubes.

10. The method for separating semiconducting nanotubes according to claim 1, wherein the heating by microwave radiation is conducted under an atmosphere of gas which reacts with the metallic nanotubes at high temperature.

* * * * *